Figure 1:
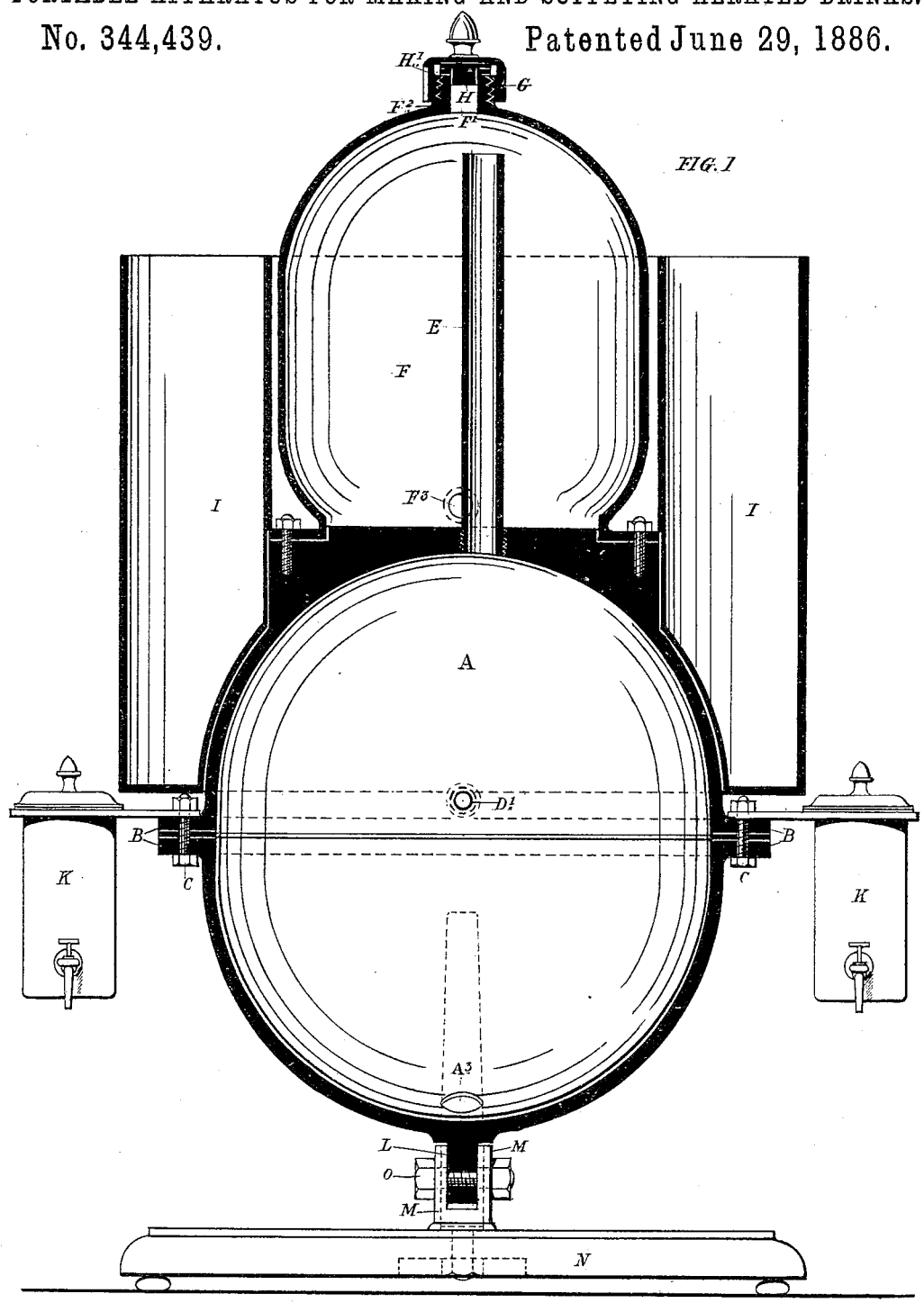

(No Model.) 3 Sheets—Sheet 1.

G. W. CHINNERY.
PORTABLE APPARATUS FOR MAKING AND SUPPLYING AERATED DRINKS.

No. 344,439. Patented June 29, 1886.

Attest:
W. A. Poulter
P. M. Knobloch

Inventor:
George W. Chinnery
per Henry Orth
his atty

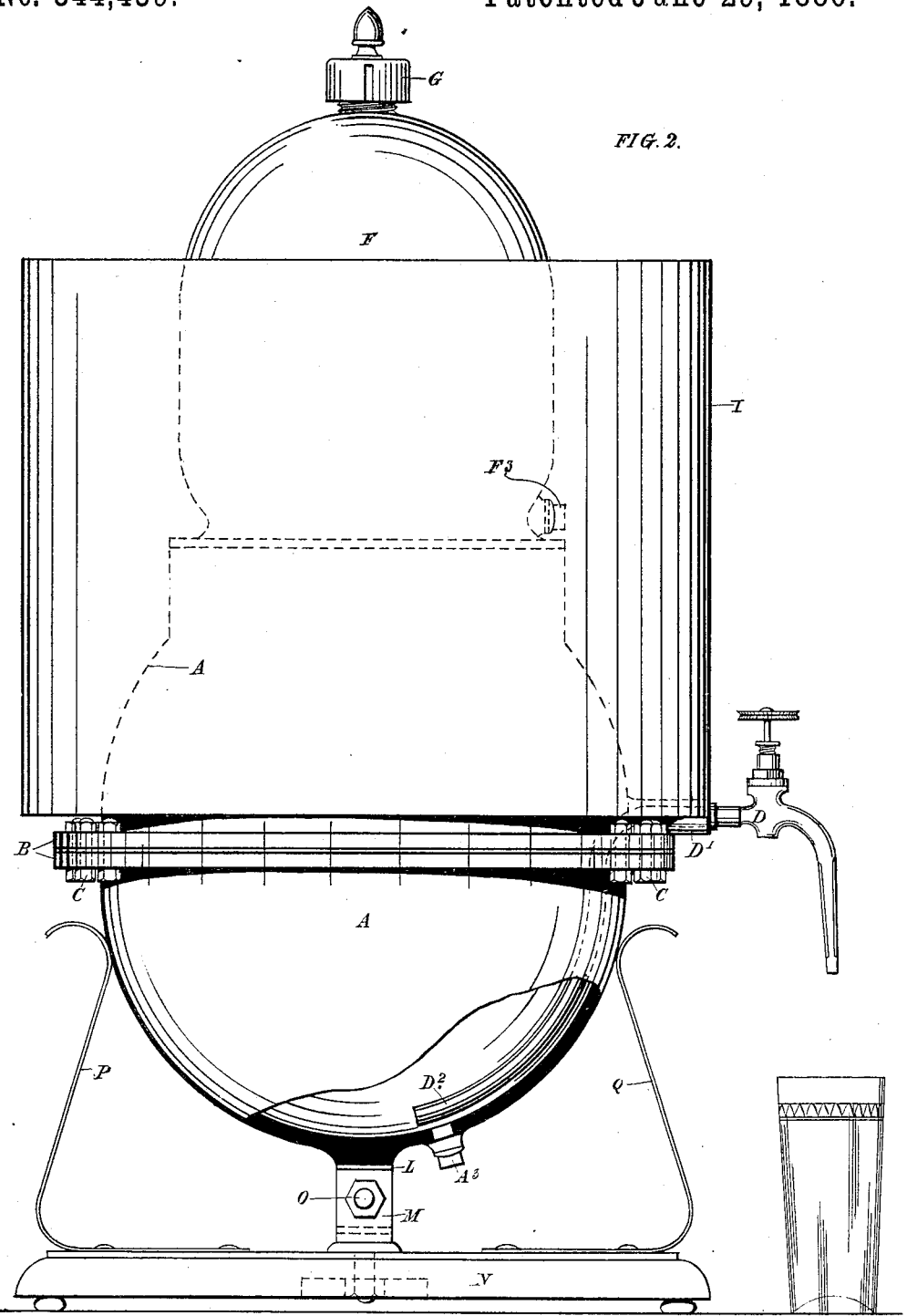

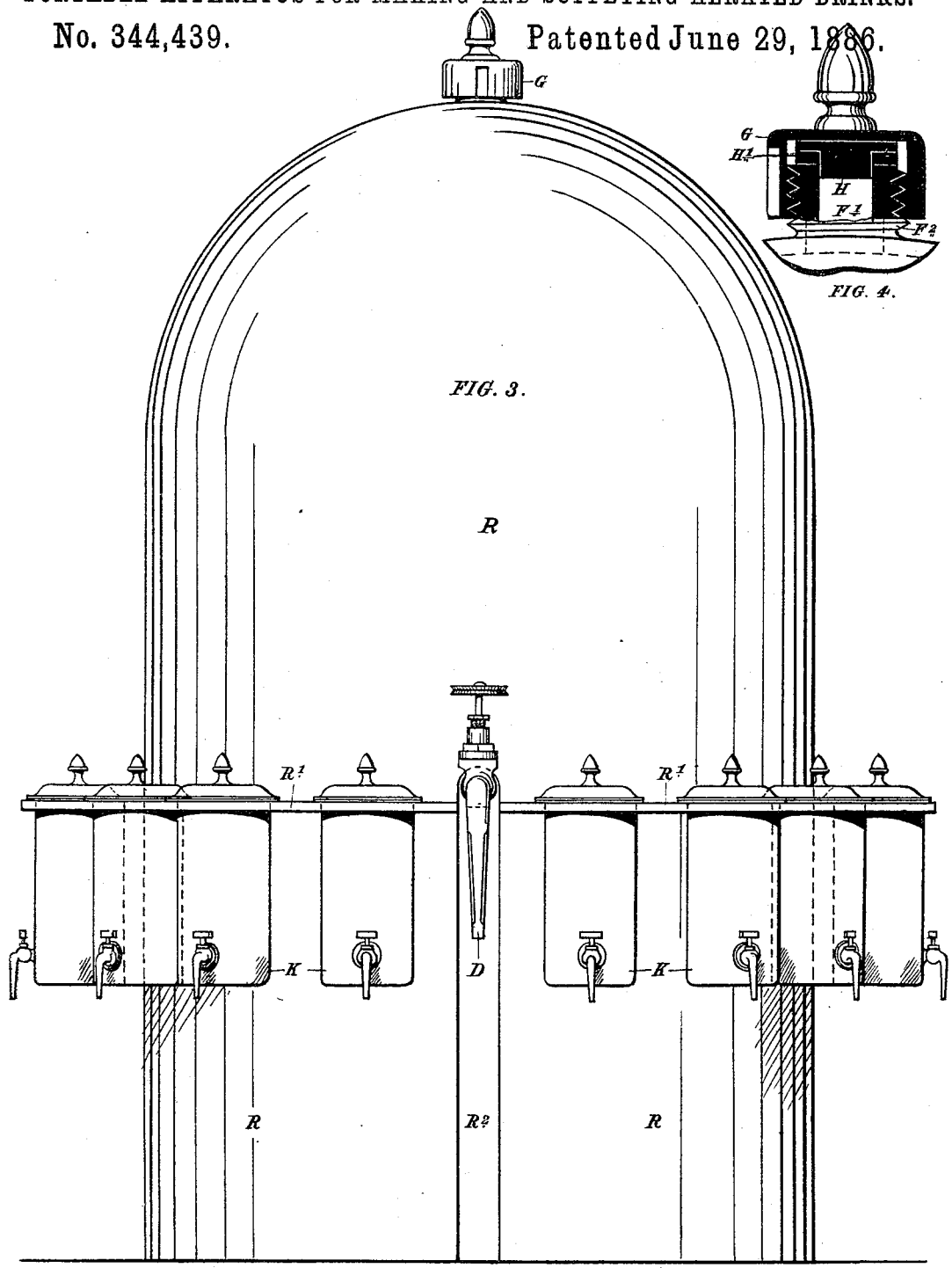

UNITED STATES PATENT OFFICE.

GEORGE WILLIAM CHINNERY, OF LONDON, ENGLAND, ASSIGNOR OF ONE-HALF TO FRANK PRYCE GRIFFITH, OF SAME PLACE.

PORTABLE APPARATUS FOR MAKING AND SUPPLYING AERATED DRINKS.

SPECIFICATION forming part of Letters Patent No. 344,439, dated June 29, 1886.

Application filed July 11, 1885. Serial No. 171,343. (No model.)

*To all whom it may concern:*

Be it known that I, GEORGE WILLIAM CHINNERY, a subject of the Queen of England, residing at London, England, have invented a new and useful Improved Portable Apparatus for the Making and Supplying Aerated Drinks, of which the following is a specification.

This invention will be best understood by reference to the accompanying drawings, in which—

Figure 1 is a vertical section of the apparatus; Fig. 2, an elevation taken in a vertical plane at right angles to that of the section, Fig. 1; Fig. 3, an elevation in the same vertical plane as Fig. 1, and Fig. 4 a detail of the cap.

Like letters represent like parts in the different views.

A is the lower chamber or vessel, in which is placed the water or other liquid to be aerated. This may be spherical or other suitable shape; but the form shown in the drawings, in which the vertical axis is longer than the horizontal one, is preferred. With this shape the weakest part is the straight piece at or near the central junction line, and this part is strengthened by the flanges B B, (of which there is one to each half or part of the vessel,) which extend entirely round the vessel and serve for securing the two parts of the vessel together by bolts C in the ordinary manner.

The tap D, for drawing off the contents of the vessel A, is preferably placed about halfway up the side—say upon a boss, D', Fig. 2, extending from the vessel just above the upper flange and long enough to carry the tap clear of the flange-cover, &c. Inside the vessel extends the pipe or channel D² to the bottom, so as to permit of approximately the whole of the contents being drawn off at the tap D. The pipe E extends from the lower vessel, A, inside the upper vessel, F, to near its top, and is preferably placed a little out of the center, so as to allow of F being charged through the aperture F', and clear of the pipe E. The position of the aperture F' could, however, be changed, if desired; but the arrangement shown is preferred. The aerating-vessel A has a solid boss, A', projecting therefrom, and said boss is formed with an annular seat, around and on which is seated the upper vessel or dome, F, which is provided with a seat-flange, f, and is secured to its seat a' by means of bolts, as shown in Fig. 1, thus providing a solid connection between the two vessels. If desired, the boss A' may be screw-threaded, and the vessel F, having a correspondingly-threaded end screwed thereto in the same way that the cap G is fitted to vessel F, and the latter vessel may be of any other suitable shape than that shown in the drawings, though I prefer the construction shown. The cap G screws onto the branch F², so as to close the aperture F', and as very great difficulty is experienced in making such a joint so secure as to resist a heavy pressure of gas, I have adopted the following means, which will be better understood by the enlarged view, Fig. 4: Upon the end of branch F², I place the brass or similar plug H, which fits into the aperture F', and carries the india-rubber washer H'. The cap G is screwed down upon the plug H, and the washer H' is squeezed between the plug and the end of the branch F², thus making a perfectly-tight joint. By this means the rubber washer is not turned round, as would be the case if the cap G pressed directly upon it. Such turning, besides spoiling the rubber, is almost certain to crumple it and work it into hills and hollows, so that it becomes extremely difficult to make a tight joint. The cap G may be screwed on with a spanner, but to prevent unauthorized persons tampering with the machine I prefer to adopt a special form, so that the cap cannot be removed without the proper spanner.

The ice-box I is an annular vessel, which fits over the dome F and rests upon the upper portion of A, to which it is fitted. It may be provided with a drain tap or plug, and its general shape and arrangement are clearly shown in Fig. 1.

The vessels K, which are arranged around the apparatus, may be supported in perforated plates secured upon the bolts C. They are intended to contain the various sirups which may be wanted.

On the bottom of the vessel A is formed a boss, *l*, that has a flat or rectilinear face, *l'*, and from said boss projects a perforated lug, L, that fits between the legs of a forked bracket or foot, M, to which said lug is pivoted. The upper faces of the legs of the bracket M are squared or rectilineal, and the pivotal connection between the lug L and bracket M is such as to allow a limited oscillation to the vessel A. It will be readily understood by an inspection of Fig. 1, which shows this construction plainly, that when the vessel A is tilted on its pivot when it reaches a certain point in its rotation the square faces of the boss $l$ and the legs of the bracket M contact and act as a stop to limit its further movement. The amplitude of the oscillation of the vessel is sufficient to shake up the contents of the generator, &c. By means of this arrangement there is no danger of tilting the vessel A, to fall over, and thereby allow any of the solids in the generator F from being carried over into the aerator A.

The apparatus is kept upright, except when pulled over, by the springs P Q, which act against each other, but allow of the movement just described, and which is useful for shaking up the contents, &c.

The form shown in Fig. 3 is the same as the others; but a non-conducting cover, R, is placed over the whole apparatus, the vessels K being let into holes in a broad flange, R', which surrounds the vessel. The slot $R^2$ is to permit the passage of the tap D when the cover is placed on or withdrawn. This cover R may generally be dispensed with in temperate climates.

The plugs $A^3$ and $F^3$ are for draining their respective vessels.

This apparatus may be constructed of the ordinary materials used for such purposes—such, for instance, as copper; but this I object to, on account of the bad effect upon the contents after they have lain in the vessel a little time. I therefore prefer to employ steel, malleable iron, or the like, coated internally (and externally also, if desired) with enamel, tin, silver, or other acid-resisting material, so that the contents may be left in the vessel for an indefinite time without deteriorating.

As an apparatus of this kind has to stand very heavy internal pressure, it must be very strong, and I find by constructing it of the material and form indicated that it will safely resist a pressure of two to three hundred pounds to the inch.

The apparatus may be charged as follows: I place in the lower vessel the liquid to be aerated, and then, having inserted a temporary plug in the top of pipe E, so as to close it for the time being, I place the soda and acid and a small portion of water in the upper vessel, F, and then, removing the temporary plug, I place the plug H, with its rubber washer, in the branch $F^2$ and screw on the cap G. The gas which is generated in F passes by the tube E to the lower vessel, A, and impregnates the liquid therein in the usual manner, and, being thus put under pressure, it can be drawn off at the tap D.

I claim—

1. An apparatus for aerating liquids, composed of an aerating-vessel of or nearly of spherical form, and a generator mounted thereon, in combination with a refrigerating-jacket surrounding the generator, and having an axial opening and a concave bearing or seat fitting on the upper portion of the aerating-vessel, substantially as and for the purpose specified.

2. An apparatus for aerating liquids, composed of an aerating-vessel, a generator mounted thereon, a refrigerating-jacket surrounding the generator and a portion of the aerating-vessel, a stand or support, and a pivotal connection between the aerating-vessel and the stand on a line with the vertical axis of the apparatus, substantially as and for the purpose specified.

3. An apparatus for aerating liquids, composed of an aerating-vessel, a generator mounted thereon, a refrigerating-jacket surrounding the generator and a portion of the aerating-vessel, a series of vessels, K, supported from the generator, a stand or support, and a pivotal connection between the aerating-vessel and the stand on a line with the vertical axis of the apparatus, substantially as and for the purpose specified.

In testimony whereof I have hereto set my hand in the presence of two subscribing witnesses.

GEORGE WILLIAM CHINNERY.

Witnesses:
ALFRED J. BOULT,
HENRY B. BRIDGE.